United States Patent [19]
Takano et al.

[11] Patent Number: 5,448,728
[45] Date of Patent: Sep. 5, 1995

[54] STORAGE MEDIUM CONTROL SYSTEM FOR CONTROLLING A WRITE-ONCE READ-MANY STORAGE MEDIUM

[75] Inventors: Sakuharu Takano; Sumio Kita, both of Nara, Japan

[73] Assignee: Sharp Kabushiki Kaisha, Osaka, Japan

[21] Appl. No.: 925,068

[22] Filed: Aug. 5, 1992

[30] Foreign Application Priority Data
Aug. 8, 1991 [JP] Japan ................... 3-199553
Aug. 29, 1991 [JP] Japan ................... 3-218742

[51] Int. Cl.⁶ ............................. G06F 9/312
[52] U.S. Cl. ................... 395/600; 395/700; 395/439
[58] Field of Search ............... 395/600, 275, 425, 700

[56] References Cited
U.S. PATENT DOCUMENTS

| | | | |
|---|---|---|---|
| 4,530,049 | 6/1985 | Zee | 395/425 |
| 4,760,526 | 7/1988 | Takeda et al. | 395/600 |
| 4,849,878 | 7/1989 | Roy | 395/600 |
| 5,043,967 | 8/1991 | Gregg et al. | 369/59 |
| 5,132,853 | 7/1992 | Kulakowski et al. | 360/48 |
| 5,153,866 | 10/1992 | Satoh et al. | 369/54 |
| 5,218,685 | 6/1993 | Jones | 395/425 |
| 5,237,661 | 8/1993 | Kawamura et al. | 395/275 |
| 5,247,660 | 9/1993 | Ashcraft et al. | 395/600 |
| 5,321,824 | 6/1994 | Burke et al. | 395/425 |

Primary Examiner—Thomas G. Black
Assistant Examiner—Cuan Pham
Attorney, Agent, or Firm—David G. Conlin; Peter F. Corless

[57] ABSTRACT

A system for accessing a write-once read-many storage medium is intended to modify and update a stored data on the medium according to an operator's desire and easily manage the modified data and the updated data on the storage medium. The system is arranged to have a first and second searching unit, a writing unit and a reading unit. The first searching unit operates to search a non-writing area next to a last data-written area on a data storage area of the storage medium and the writing unit operates to read the updated data on the searched area. The second searching unit operates to search a last data-written area on the storage medium and the reading unit operates to read the data from the searched area. For searching the area by the second searching unit, a binary search may be used.

6 Claims, 19 Drawing Sheets

POINTER POINTING TO A LOCATION OF A START BLOCK OF DATA

VALID DATA

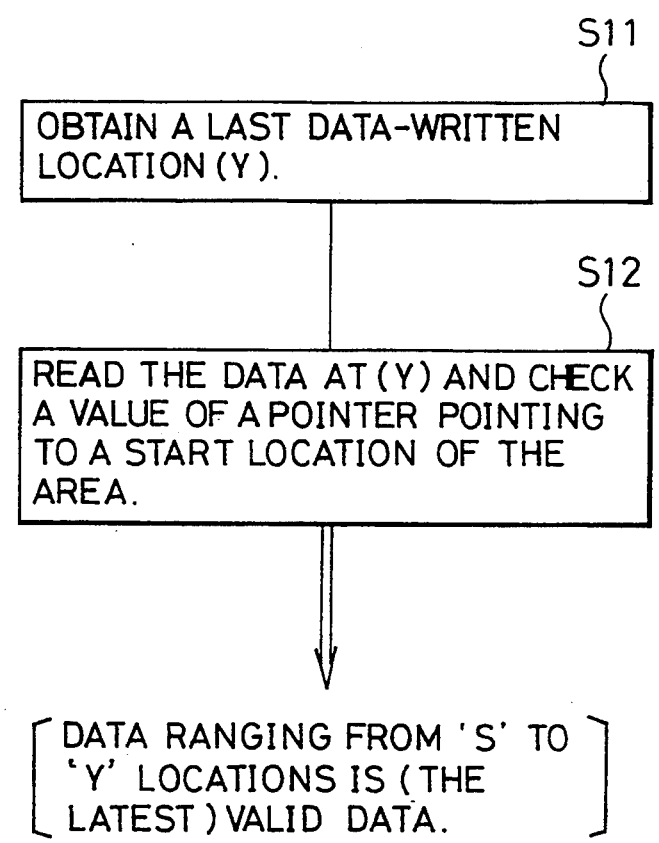

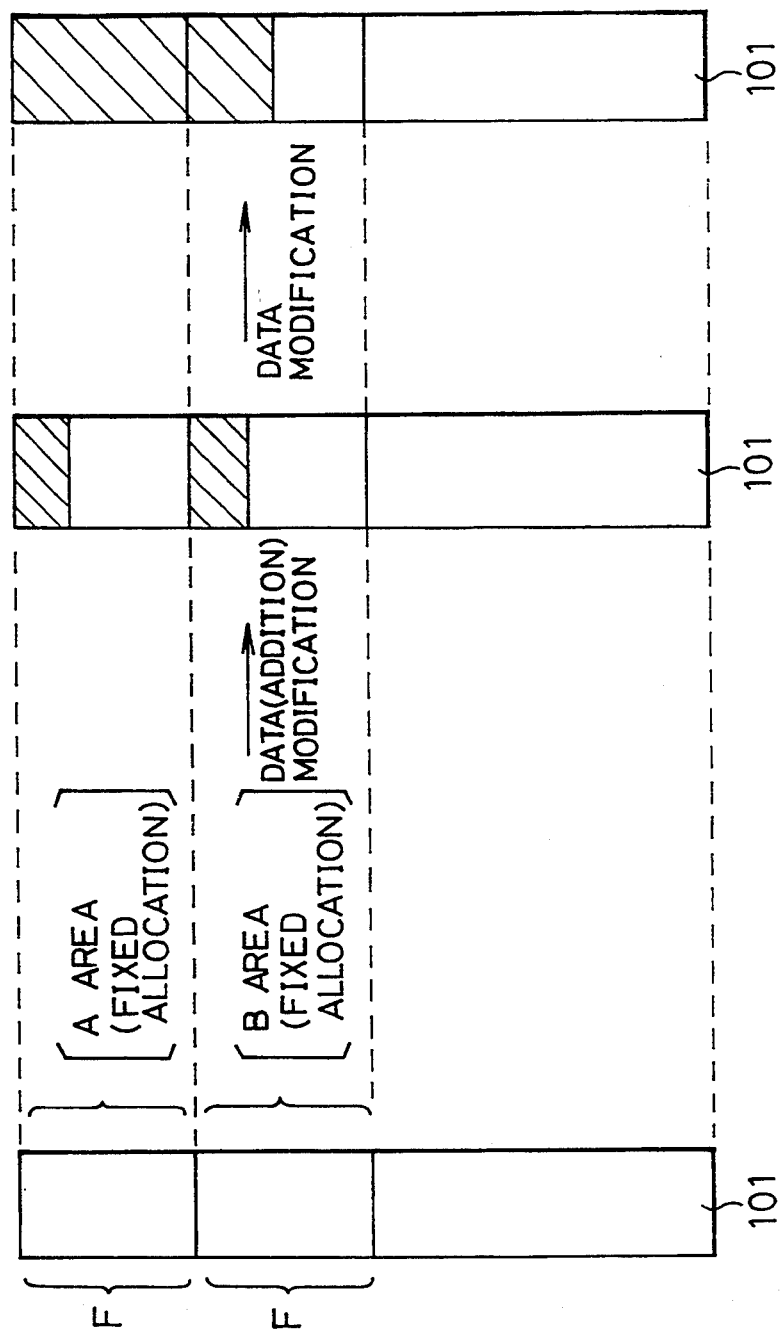

• READ

STORAGE MEDIUM CONTROL SYSTEM FOR CONTROLLING A WRITE-ONCE READ-MANY STORAGE MEDIUM

BACKGROUND OF THE INVENTION

1. Field of the Invention

The present invention relates to a system for accessing a write-once read-many storage medium in which data is written on a storage area but the written data is not allowed to be physically modified and updated.

2. Description of the Related Art

In general, on a storage medium such as a harddisk or a floppy disk, data stored on the medium are allowed to be physically modified and updated by accessing the data on a storage location. On the other hand, a storage medium such as an optical disk employs a so-called destructive writing system, in which data stored on a storage medium are not allowed to be physically modified and updated. The modifying and updating operation may result in allowing a writing error to take place.

To modify and update the stored data, therefore, a conventional system for accessing a write-once read-many storage medium is arranged as follows. At first, an updated data is written on another non-written area and a management table is additionally written on a non-writing area. To read the updated data, an operator operates the system to read the management table on a CRT and select the latest updated data on the CRT.

To read the updated data, however, the known system for accessing a write-once read-many storage medium is arranged so that the operator operates the system to read the management table on the CRT and select the latest updated data. The operator thus cannot modify and update the stored data. Further, it is quite difficult for the operator to manage the modified data and the updated data.

SUMMARY OF THE INVENTION

It is therefore an object of the present invention to provide a system for accessing a write-once read-many medium in which an operator can modify and update the data stored on the medium and easily manage the modified data and the updated data on the medium.

According to a first aspect of the invention, a system for accessing a write-once read-many storage medium includes: first search mechanism for searching a non-writing area next to a last data-written area on a data storage area included in the write-once read-many storage medium; write mechanism for writing updated data on the non-writing area searched by the first search mechanism; second search mechanism for searching a last data-written area on the data storage area; and read mechanism for reading data from the last data-written area searched by the second search mechanism.

According to a second aspect of the invention, a system for accessing a write-once read-many storage medium is arranged so that the writing mechanism serves to write the updated data on the non-writing area of the data storage area and a management data about the updated data and the read mechanism serves to search the last data-written area with reference to the management data.

According to a third aspect of the invention, a system for accessing a write-once read-many storage medium is arranged so that the writing mechanism serves to read the data written on the data storage area by using DMA (direct memory access) transfer in order to search the non-writing area.

According to a fourth aspect of the invention, a system for accessing a write-once read-many storage medium is arranged so that the writing mechanism serves to allocate any empty area of the storage medium as another data storage area and write the updated data and a management data when the data area has no space for the updated data, the management data containing information indicating a location of the allocated area.

According to a fifth aspect of the invention, a system for accessing a write-once read-many storage medium is arranged so that the writing mechanism serves to change allocation of the data storage area according to the empty area in a case that the updated data is written on the storage area and write a new management table for the changed allocation.

According to a sixth aspect of the invention, a system for accessing a write-once read-many storage medium is arranged so that the writing mechanism serves to write only a updated portion of data on the non-writing area and to write a management table containing a location of the portion and the read mechanism serves to read the portion, the data to be updated and the management table and expand these read data into the updated data.

According to a seventh aspect of the invention, a system for accessing a write-once read-many storage medium includes: a first and second data storage area each having a plurality of blocks; mechanism for combining additional data with a last written data in a block of the first data storage area and writing the combined data in the next block in a case that a volume of the combined data does not exceed a volume of one block; mechanism for dividing additional data into a first and second part in a case that the additional data exceeds a volume of a remaining area of a last data-written block of the first data storage area, a volume of the first part being selected to be equal to the volume of the remaining area, and for combining data written in the block of the first data storage area with the first part of the additional data and writing the combined data on the second data storage area and writing the second part of the additional data in the next block of the first data storage area; and mechanism for reading all data on the second data storage area and data in a last data-written block of the first data storage area and combining the data of the first data storage area with the data of the second data storage area.

According to an eighth aspect of the invention, a system for accessing a write-once read-many storage medium includes: mechanism for searching a non-writing area next to a last data-written area on a data storage area of the write-once read-many storage medium through the effect of a binary search method and writing updated data on the searched non-writing area; and mechanism for searching a last data-written area on the data storage area and reading data from the searched area.

In operation, in the system according to the first aspect of the invention, the first search and write mechanism serves to search a non-writing area next to the last data-written area on the overall data storage area of the write-once read-many medium and serially write the updated data on the searched non-writing area. Then, the second search and read mechanism serves to search the last data-written area of the overall data storage area and read the data from the searched area. To read the data from the storage area, therefore, the latest updated data is allowed to be read. Further, the updated data on the storage medium is allowed to be easily managed.

In the system according to the second aspect of the invention, the write mechanism serves to write the updated data and the relevant management data on the storage area. Then, the read mechanism serves to search the last data-written area on the written management data. If, therefore, the amount of the updated data exceeds a minimal unit (block), an operator can modify and update the data stored on the write-once read-many medium and easily manage the updated data on the medium.

In the system according to the third aspect of the invention, the write mechanism serves to rapidly search a non-writing area by reading the data written on the area through the effect of DMA transfer and thereby write the updated data at high speed.

In the system according to the fourth aspect of the invention, the write mechanism serves to allocate any empty area of the write-many read-once storage medium as a data storage area and write on the allocated area the updated data and the management table containing information indicating at least the allocated area. Hence, it is possible to allocate the data storage area according to an operator's will and effectively use the data storage area of the write-once read-many medium.

In the system according to the fifth aspect of the invention arranged relevant to the system according to the fourth aspect, the write mechanism serves to change allocation of the data storage area according to an empty area when writing the updated data and write a new management table for the changed allocation of the area. Hence, it is possible to change the allocation of the set data storage area if necessary and thereby effectively use the data storage area of the write-many read-once medium.

In the system according to the sixth aspect of the invention, the write mechanism serves to write the second data and the management table on a non-writing area, the second data indicating only a portion to be changed and modified on the first updated data and the management table indicating the content of change and modification. Then, the read mechanism serves to read the first data, the second data and the management data and expand the read data into the latest updated data. Hence, if the first data to be updated contains a portion to be kept unchanged, after update, the portion is used as part of the latest data. As a result, it is possible to effectively use the data storage area of the write-once read-many medium.

In the system according to the seventh aspect of the invention, if the data obtained by adding additional data into the data of the first block, that is, the last data-written block, selected from a plurality of blocks on the first data storage area does not reach a volume of one block, the write mechanism serves to write the obtained data into the second block next to the first block. On the other hand, if the obtained data reaches a volume of one block, the write mechanism serves to write the data filled up in one block on the second data storage area of the write-many read-once storage medium and the data overflown from the block on the second block of the first data storage area. After this writing, the read mechanism serves to read the data written on the second data storage area and the data from the second block, that is, the last data-written block on the first data storage area and read the data read from both the first and the second data storage areas as the latest data. This reading and writing operations make it possible to reduce the reading time and effectively use the data storage area of the write-once read-many storage medium as keeping the reading efficiency improved.

The accessing system according to the eighth aspect of the invention includes the write mechanism and the read mechanism. The write mechanism operates to search a non-writing area next to a last data-written area on the data storage area of the write-once read-many storage medium and serially write the updated data on the searched area. For searching the area, the binary search method is used. The method is arranged to divide the data storage area to be searched into two, discard one and search the other. This process is continued until the non-writing area is found out. The read mechanism operates to search the last data-written area on the data storage area and read the data from the searched data-written area. When reading the data from the data storage area, the latest updated data is allowed to be picked up. This system makes it possible for an operator to rapidly modify and update the data stored on the write-once read-many storage medium and easily manage the updated data on the storage medium.

Further objects and advantages of the present invention will be apparent from the following description of the preferred embodiments of the invention as illustrated in the accompanying drawings.

BRIEF DESCRIPTION OF THE DRAWINGS

FIG. 7 is a flowchart showing an operation of a system for accessing a write-once read-many storage medium according to the second embodiment of the invention.

FIGS. 10A and 10B are explanatory views showing a system for accessing a write-once read-many storage medium according to a third embodiment of the invention;

DESCRIPTION OF THE PREFERRED EMBODIMENTS

The description will be directed to a system for accessing a write-once read-many storage medium according to a first embodiment of the present invention as referring to FIGS. 1 to 4.

Figure 1:
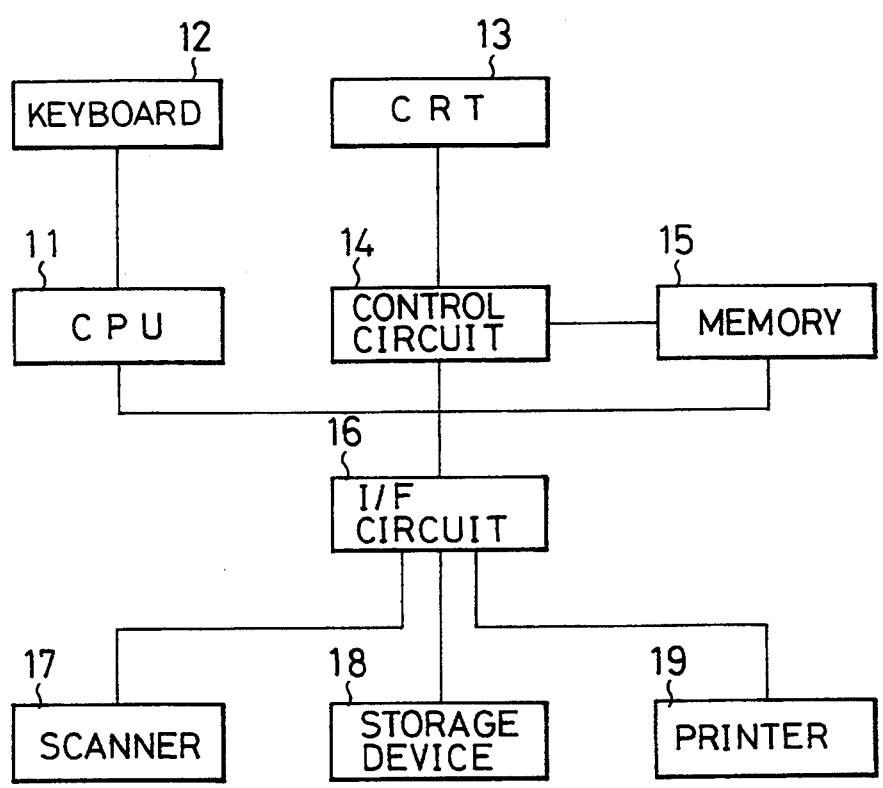
FIG. 1 is a block diagram showing a system for accessing a write-once read-many storage medium according to a first embodiment of the invention.

In FIG. 1, 11 denotes a CPU (Central Processing Unit) under which a data or command input through a keyboard 12 is processed. 14 denotes a control circuit which serves to control a CRT 13 and the reading and writing of a memory 15. The CPU 11 processes the data read from a scanner 17 connected to the CPU 11, the control circuit 14 and the memory 15 through an I/F (interface) circuit 16, controls the writing and the reading of a write-many read-once storage device 18, and control printing of a printer 19. The write-many read-once storage device 18 and the printer 19 are connected to the CPU 11 via the I/F circuit 16. 15 denotes a memory configured of a RAM (Random Access Memory), for example. The storage device 18 is arranged to have an optical disk and its drive.

Figure 2:
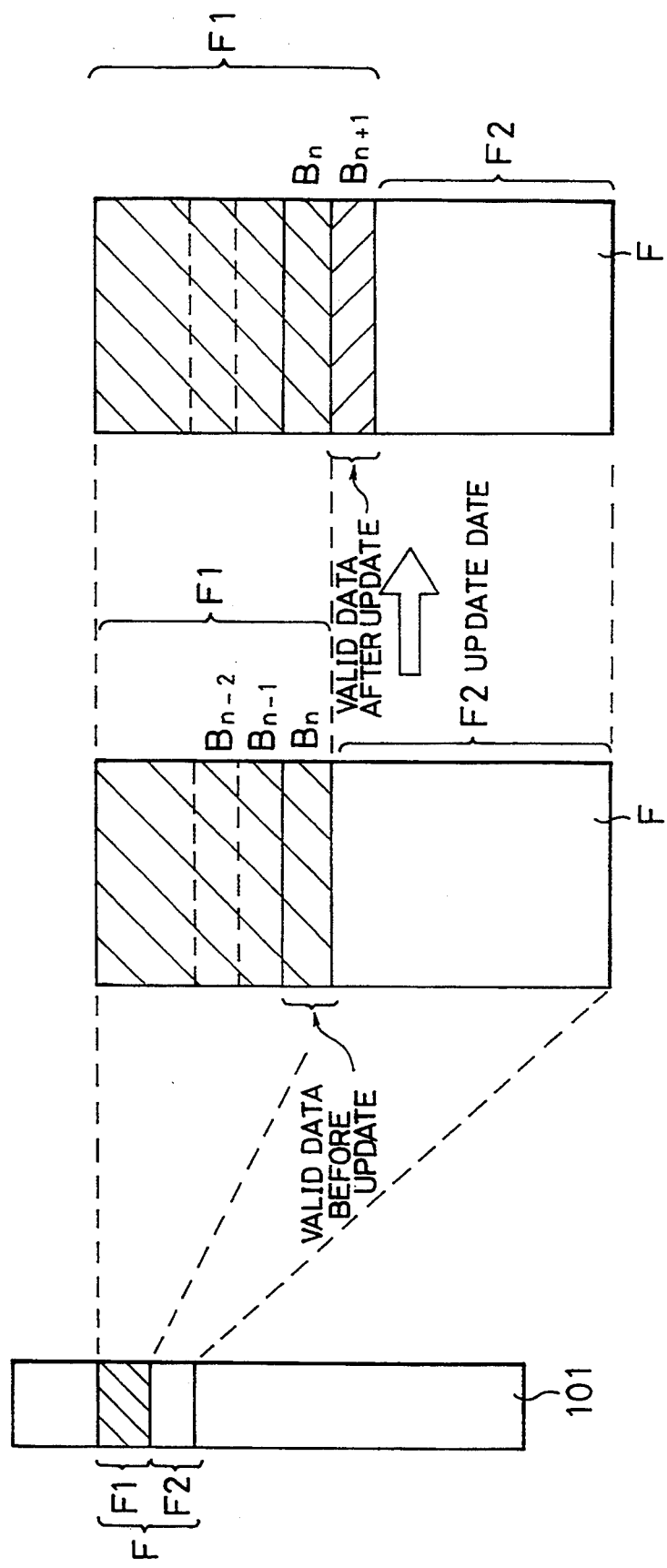
FIG. 2 is an explanatory view showing a storage area of an optical disk served as the storage medium included in the system shown in FIG. 1.

Turning to FIG. 2, each data file F contained on an optical disk of the storage device 18 consists of blocks, each block being a minimal unit of 512 or 1024 bytes. One piece of data of the file F is stored on one block. The volume of each block is different according to a type of a storage medium.

The CPU 11 serves to allocate each data file F into the storage area while assigning a storage location and a storage size to the area when storing operation of data files is required. If there exist a plurality of files F to be handled, those files F are allocated to the corresponding storage areas. The size of each area is defined by considering the expected number of updates.

To store a data on an optical disk, the data is stored from a head block B1 of the File F as shown in FIG. 2. To update the stored data, the CPU 11 operates to read the data from the optical disk into the memory 15, display the read data on the CRT 13, and modify the data in the memory 15 according to a data and a command input through the keyboard 12. To register the modified data on the optical disk, as shown in FIG. 2, the modified data is transferred from the memory 15 into a block Bn+1 next to the last data-written block Bn within the storage area (data allocated area) composing the File F specified from the overall data storage area 101 of the optical disk. Each time when the data is updated on the file F, the written area F1 is made larger and the non-writing area F2 is made smaller accordingly.

Figure 3:
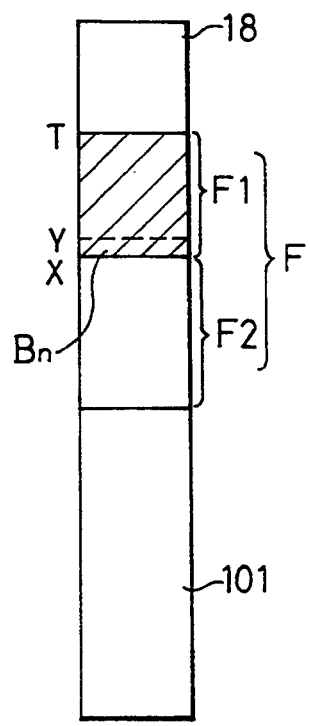
FIG. 3 is an explanatory view showing addresses of the storage area shown in FIG. 2.
Figure 4:
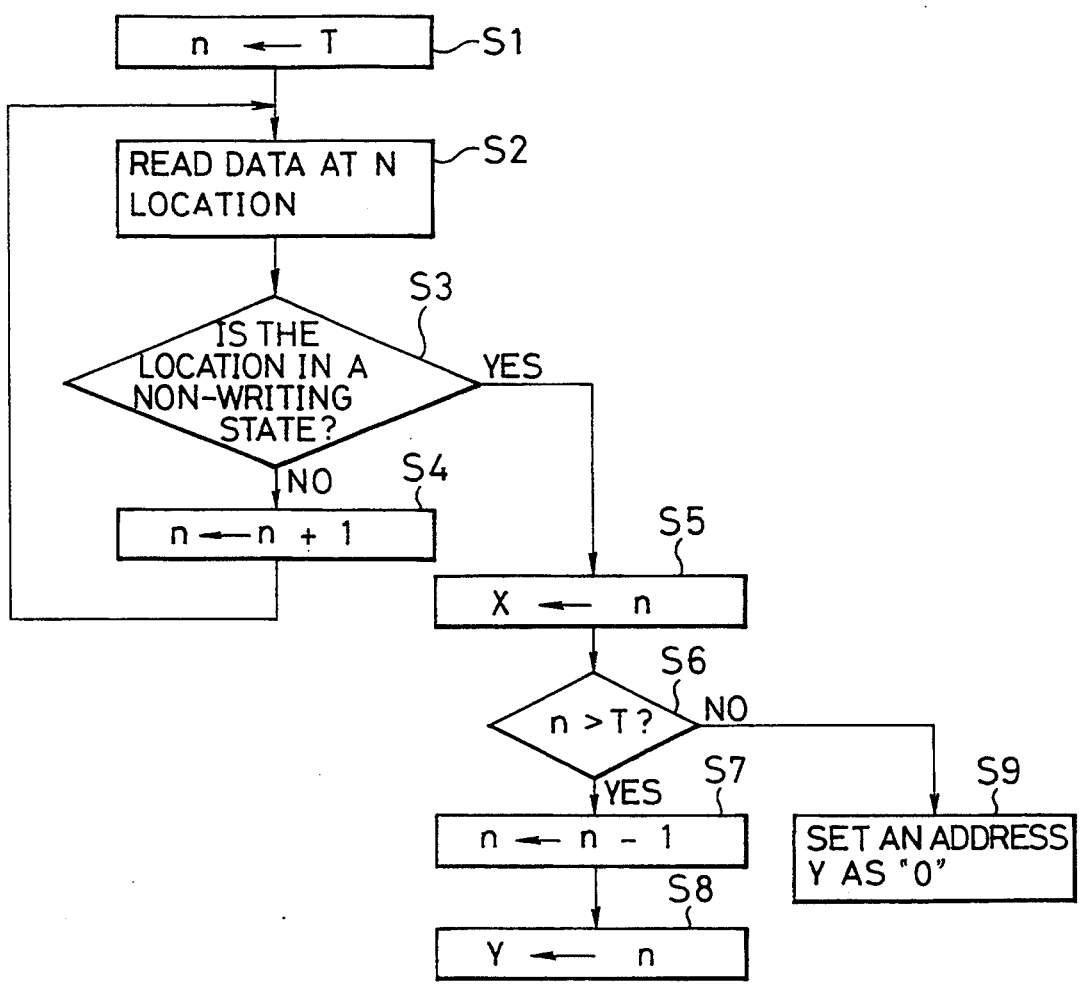
FIG. 4 is a flowchart showing an operation of the system shown in FIG. 1.

Next, the description will be directed to the process for updating the data and reading the updated data as referring to FIGS. 3 and 4. In FIG. 3, T denotes a head address of the File F. Y denotes a last address of the written area F1 of the file F. X denotes a head address of the non-writing area F2 of the file F.

To update the stored data, an address T indicating a location of a head block B1 of the file F is set to a read address n (step S1 of FIG. 4). The data of the read address n is read from the optical disk and is stored in the memory 15 (step S2). Next, it is determined whether or not the area of the read address n is in a non-writing state (area F2) (step S3). If not, the read address n is incremented (step S4) and then the process returns to the step S2 from which the non-writing area F2 is searched. At the step S4, it is preferable that the size of the data area of the file F is checked.

After the non-writing area F2 is searched, the process is branched from the step S3 to S5, at which a read address n is set to a writing address X for the updated data. Then, it is determined whether or not the read address n is larger than the initial address T of the stored data (step S6). If n>T, the read address n is decremented (step S7) and is set to the last address Y of the stored data (step S8). Then, the updated data is stored in the head address X on the non-writing area F2. At the step S7, it is preferable that the stored data should be checked since the write error may have occurred.

If n≦T at the step S6, nothing is written on the overall optical disk. The process is branched to a step S9. At this step, the last address Y of the stored data is set to an address "0" and the data is stored on the area of the write address X.

To read the updated data, the data is serially read out of the write address T and the latest updated data on an end part of the unwritten area F1 and the next non-writing area F2 are searched in turn. Then, it is determined whether or not the data on the written area F1 before the non-writing area F2 is valid. If it is, the latest updated data is read from the written area F1.

According to this embodiment, therefore, the CPU 11 operates to read the data written on the optical disk, search the non-writing area F2 next to the written area F1, serially write the updated data on the non-writing area F2. At a time, the CPU 11 operates to search the written area F1 of the latest updated data written on a data area of the optical disk and read the latest updated data therefrom. Hence, an operator can modify and update the data stored on the write-once read-many storage medium and easily manage the modified data and the updated data on the optical disk. This operation has another convenience, because it makes it possible to manage a history of the updated data.

In this embodiment, to search the area on which the updated data is stored, the searching operation is started from a write address at the head of the file F (steps S1 to S4). Alternatively, the operation may be started from a last write address of the file F.

The description of the foregoing embodiment has been made by an example of a un-rewritable storage medium such as an optical disk. This embodiment may apply to a rewritable storage medium such as a hard-disk. In this case, the updated data is allowed to be serially written on the medium without erasing the storage data. Hence, it is possible to manage a history of the updated data and secure safety of the stored data. Further, if a flag indicating a non-writing state is set to a predetermined area of each block of the storage medium, the searching operation for the non-writing area can be made simpler.

Figure 5:
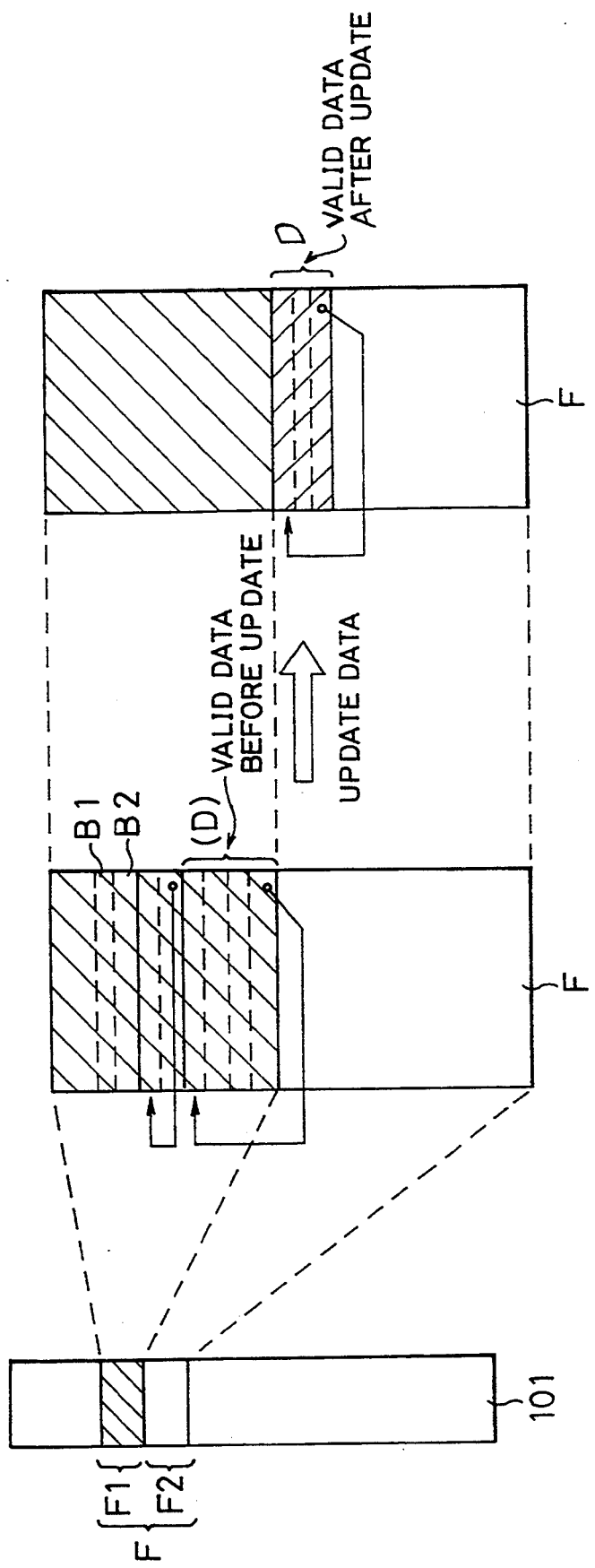
FIG. 5 is an explanatory view showing a storage area of an optical disk served as a write-once read-many storage medium included in a system for accessing the storage medium according to a second embodiment of the invention.

In turn, the description will be directed to a system for accessing a write-once read-many storage medium according to a second embodiment of the present invention as referring to FIGS. 5 to 7, in which FIG. 5 shows a storage area of an optical disk, FIG. 6 shows an address of a storage area and FIG. 7 is a flowchart showing an operation of this system. In the first embodiment, one piece of data is written on each block B1. so that if the data has a larger volume than one block, the data is not allowed to be written thereon. On the other hand, in the second embodiment, even if the data has a larger volume than one block B1, the data is allowed to be processed.

The accessing system of this embodiment has the substantially same components as that of the first embodiment, Hence those components have the same reference number (in particular, the components shown in FIG. 1).

Figure 6A:
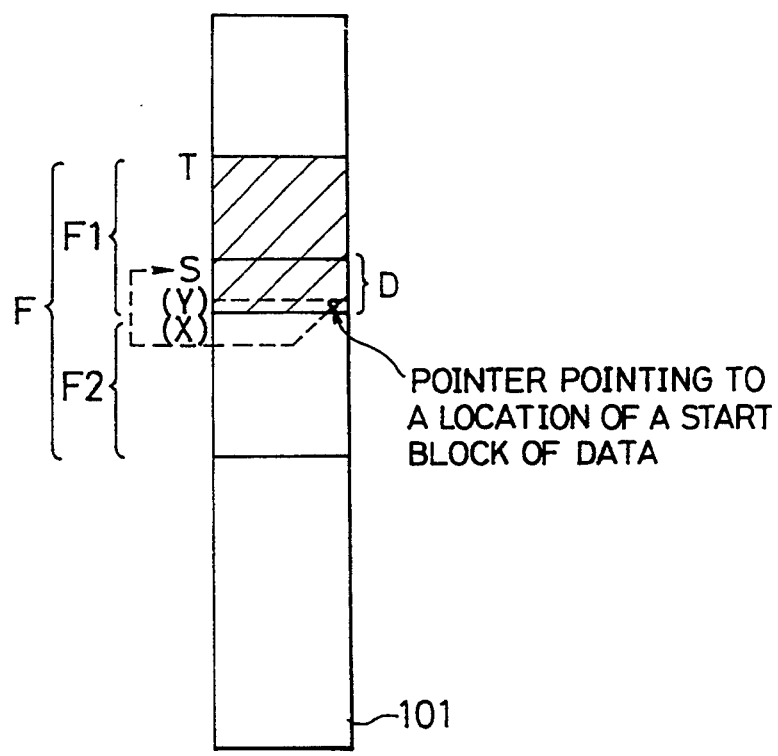
FIGS. 6A and 6B are explanatory views showing addresses of the storage area shown in FIG. 5.

As shown in FIG. 6A, in the second embodiment, the storage area of each file F of an optical disk consists of blocks, each of which is a minimal unit of 512 or 1024 bytes like the first embodiment. If, however, the write data D has a volume corresponding to two or more blocks B1, the accessing system of this embodiment is arranged to serially write the write data D on the serial blocks and write management data containing a data size and a start location (pointer S) at the tail of the write data D. The process of writing the updated data D is substantially same as that of the first embodiment. Hence, the detailed description about the writing process will be left out.

Next, the process of reading the updated data D will be roughly described as referring to FIGS. 6A and 7. In FIG. 7, at a step S11, the stored data is read from the serial blocks B1 into the memory 15. At a next step S12, the process is executed to search a data size and a pointer S of the last management data (address Y) and read all the latest data D by referring to the data size and the pointer S.

According to the second embodiment, therefore, if the write data D has a volume corresponding to two or more blocks, the accessing system is arranged to write the data on the serial blocks B1 and the management data containing the data size and a start location (pointer S) at the tail of the write data D. It means that this system has a capability of processing the data D having a larger volume than one block B1.

Figure 6B:
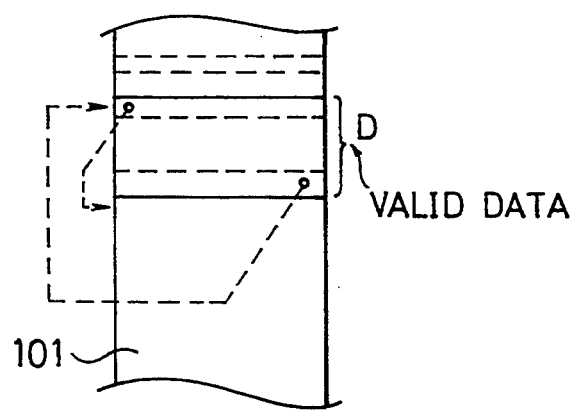

In addition, as shown in FIG. 6B, it is preferable that the actual accessing system should be arranged to provide a pointer indicating the next block of the effective data in the start block of the data D for avoiding occurrence of a writing error as much as possible.

Figure 8:
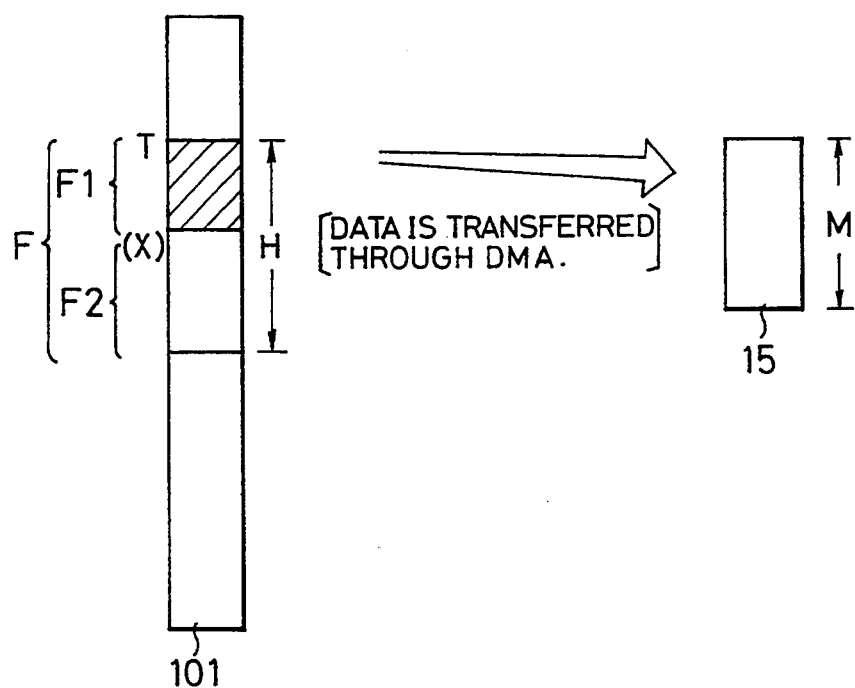
FIG. 8 is an explanatory view showing a DMA transfer executed in a system for accessing a write-once read-many storage medium according to a third embodiment of the invention.
Figure 9:
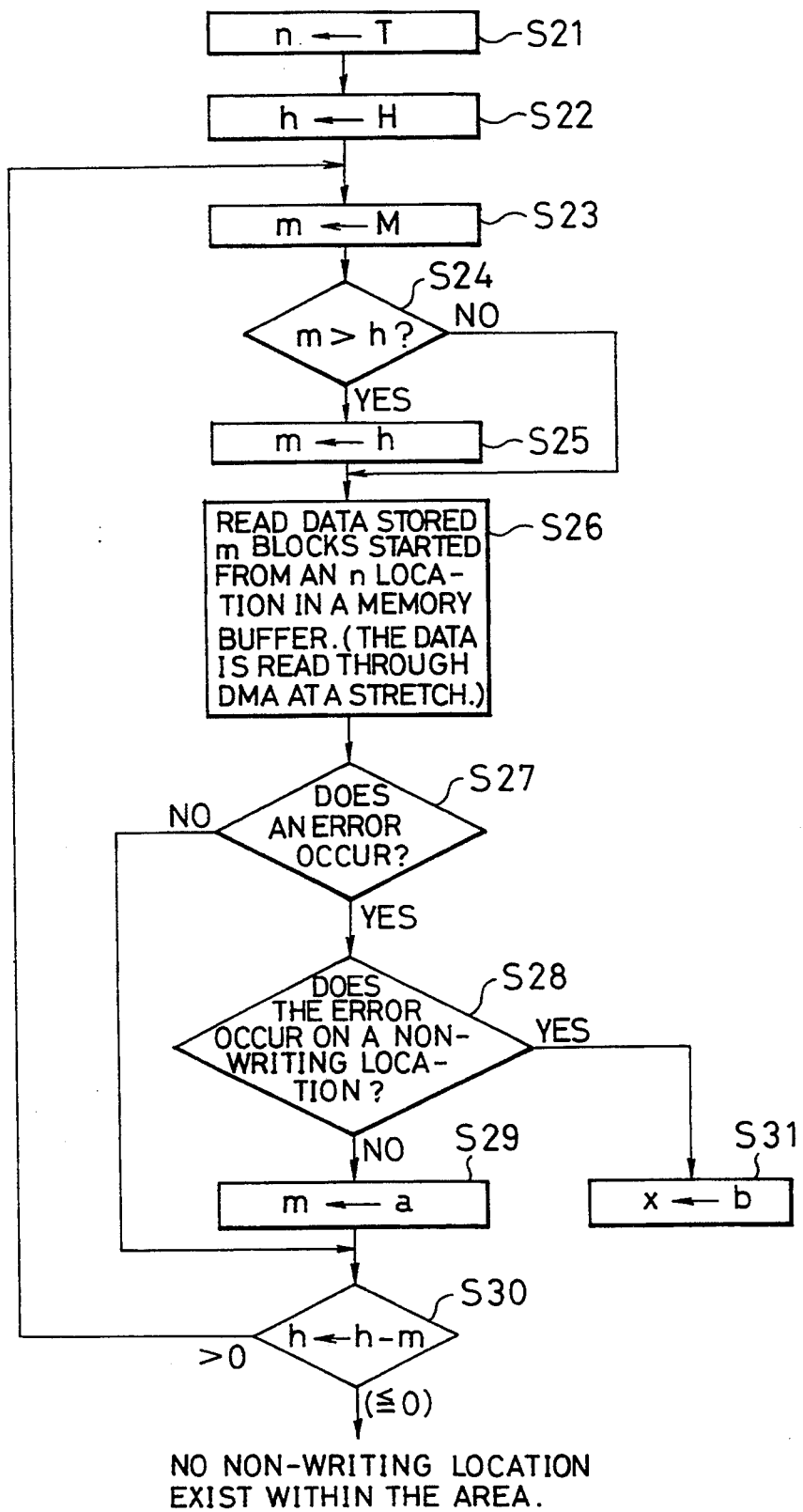
FIG. 9 is a flowchart showing an operation of the system shown in FIG. 8.

In turn, the description will be directed to a system for accessing a write-once read-many storage medium according to a third embodiment of the present invention as referring to FIGS. 8 and 9, in which FIG. 8 is an explanatory view showing a DMA (Direct Memory Access) transfer executed in this embodiment and FIG. 9 is a flowchart showing the operation of this system. In the second embodiment, the accessing system is arranged to read all the stored data on the written area F1 into the memory and search the head address of the non-writing area F2. This arrangement results in consuming a long processing time of the CPU 11 such as a ready-check time and a seek time. On the other hand, in this embodiment, the accessing system further includes a DMA controller for reducing the processing time of 3 u the CPU 11.

The accessing system of this embodiment has the substantially same components as that of the first embodiment. Hence, those components have the same reference number (in particular, the components shown in FIG. 1).

As shown in FIG. 8, a buffer area (volume M) is secured in the memory 15 for saving the data stored on the optical disk. This buffer area should be large enough to save all the data of an allocated area of the optical disk. However, if the system cannot secure a sufficient volume for the buffer area, the buffer area should be as large as possible.

In FIG. 9, the process is executed to set a start block location T of the file F, that is (n ? T), at a step S21, a read data amount H of the file F, that is (h ? H) at a step S22, and a buffer volume M of the memory 15, that is (m ? M), at a step S23. Next, if the set buffer volume m is larger than the data amount h, the read data amount h is set to the buffer volume m (steps S24 and S25). The CPU 11 controls the DMA controller so that all the data of the file F may be DMA-transferred from the optical disk to the buffer area of the memory 15 (step S26).

During the reading time, the CPU 11 can execute another processing. At this step S26, the DMA controller operates to return the current read processing block amount a ($\leq m$) and the last read location (or a location where an error occurs if any) b as status data to the CPU 11.

In a case that all the data is read without any error, it means that no non-writing block exists in an allocated area of the file F. On the other hand, an error occurs when the data is read from the non-writing area F2 or when the data is read from the written area F1. The meaning of the errors are seen from an error status. Hence, in the former case, the block where the error occurs is a head block of the non-writing area F2. In the latter case, it is possible to search the non-writing area F2 by further reading the data.

In FIG. 9, if an error occurs, the process goes from a step S27 to S28 at which it is determined whether or not the error has occurred on the non-writing location F2. If not, the process goes to a step S29. At this step, the amount of the current read block a is set as the buffer volume m of the memory 15. Then, the process goes to a step S30. If no error occurs, the process directly goes from the step S27 to a step S30.

At the step S30, the read data amount h is set as the remaining data amount ($=h-m$), and the process returns to a step S23 at which the remaining data is read out. If, at the step S30, the read data amount h is smaller than the remaining data amount ($h-m$), it means that no non-writing location F2 exists on the optical disk. Hence, the updated data is disallowed to be written on the optical disk. If, at the step S28, the error has occurred on the non-writing location F2, as mentioned above, it means that the location where the error has occurred corresponds to a start location of the non-writing area F2. Hence, the location b where the error has occurred is set to the head writing location for the updated data (step S31) in addition.

According to this embodiment, as mentioned above, the stored data is transferred from the optical disk to the memory 15 through the effect of the DMA controller. This results in reducing a time consumed in searching a head writing location for the updated data. Hence, the processing time can be reduced by removing a ready-check time and a seek time. If the amount of the stored data is small, the processing efficiency can be improved. Moreover, the CPU 11 can execute another processing during the DMA transfer.

Figure 10B:
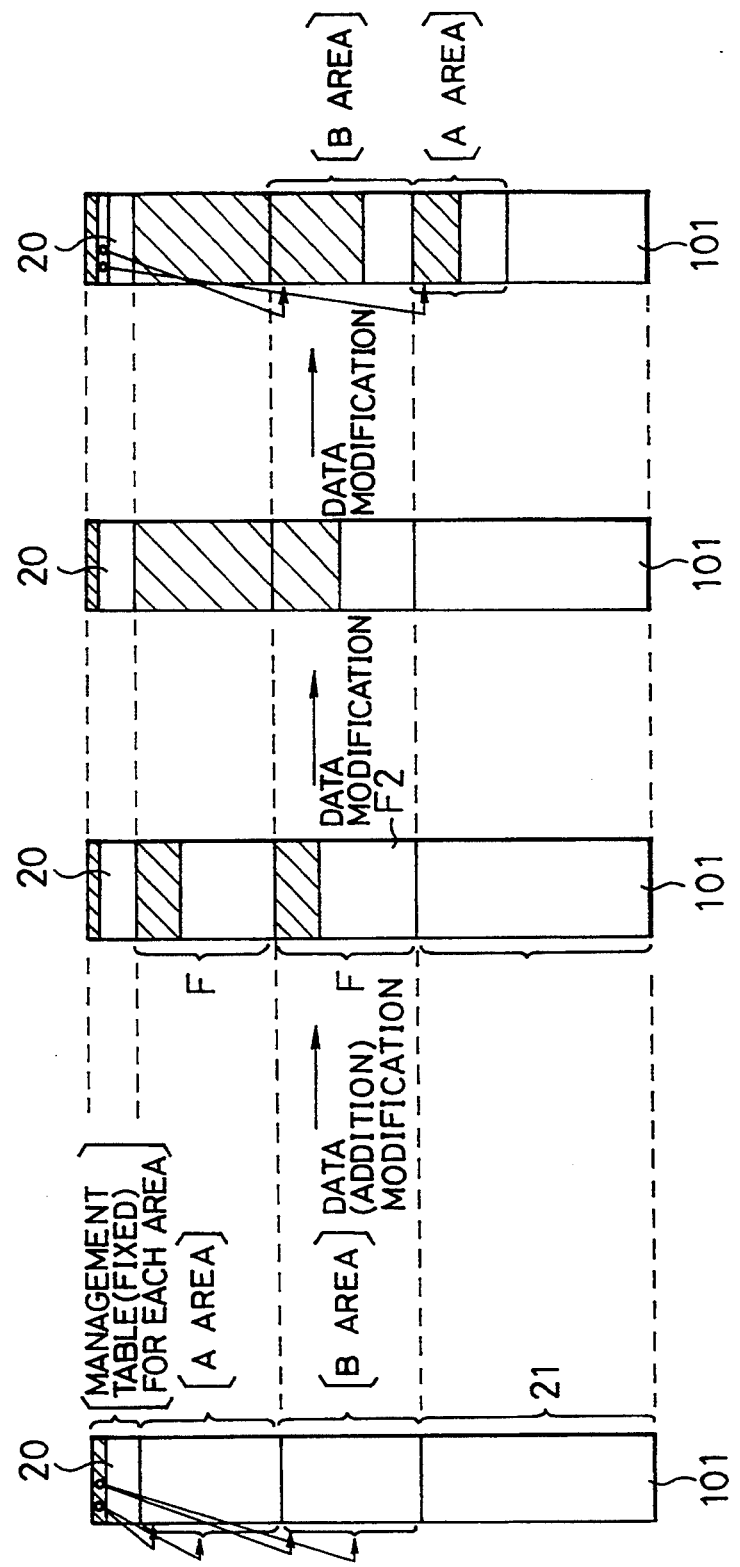

In turn, the description will be directed to a system for accessing a write-once read-many storage medium according to a fourth embodiment of the present invention as referring to FIGS. 10A and 10B, in which FIG. 10A is an explanatory view showing a storage area of the optical disk included in the first to the third embodiments and FIG. 10B is an explanatory view showing a storage area of an optical disk included in the present fourth embodiment.

As shown in FIG. 10A, the accessing systems according to the first to the third embodiments are each arranged to fix an allocated storage area of the optical disk on each file F. If the storage area is filled with the updated data, no additional updated data is allowed to be written. If lots of updates take place on a certain file according to a user's desire, no additional updated data is allowed even if an empty area is left on the optical disk.

To overcome this shortcoming, the accessing system according to this embodiment is arranged to effectively use the empty area for writing the updated data. As shown in FIG. 10B, at the head of the storage area, a management table 20 is secured in the range of a head block to a proper block. This management table 20 is configured of a start block location and a size (or a last block location) of each file F. In addition, the management table 20 may be variable as described above. However, in FIG. 10B, it is allocated in a fixed manner.

The data area of each file F is secured from the area from the area following the management table 20 up to the area so as to keep a proper size (normally used minimal size + a). At an area around the tail, a non-use reserve area 21 is secured. Like the first to the third embodiments, the updated data is written on the area of the file F. If the area of the file F is full of the data, the new updated data is written in the reserve area 21 and the management table 20 is updated and written.

According to this embodiment, therefore, the updated data may be written on the reserve area 21 of the optical disk. If lots of updates may take place on a certain file according to a user's desire, the additional updated data may be written on the file. The accessing system according to this embodiment is arranged to write the updated data on the reserve area 21. Alternatively, it may be arranged to write the updated data on an empty area F2 of another file in which not so much updates take place.

Figure 11:
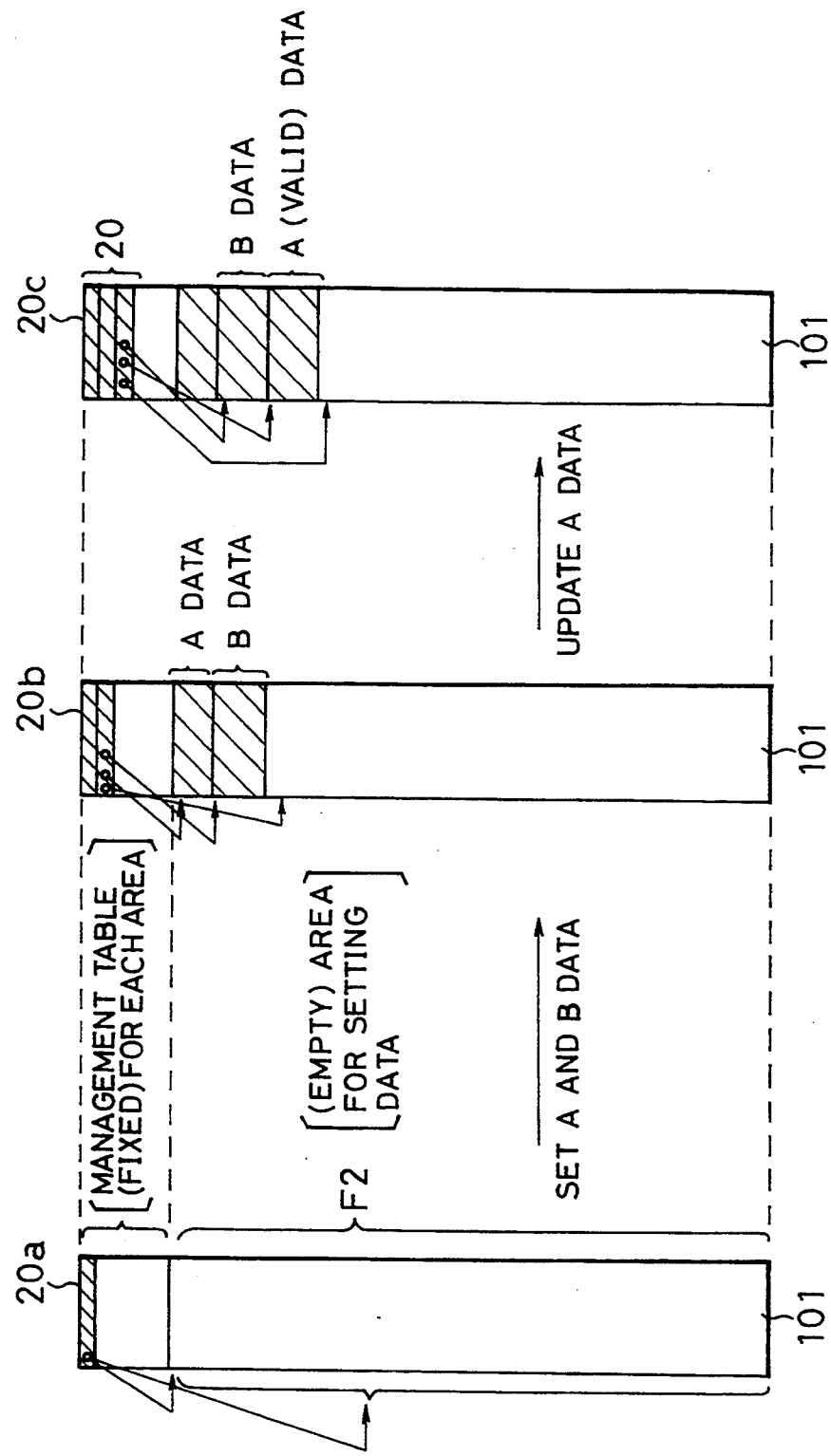
FIG. 11 is an explanatory view showing a storage area of an optical disk served as a write-once read-many storage medium included in a system for accessing the storage medium according to a fourth embodiment of the invention.

In turn, the description will be directed to a system for accessing a write-once read-many storage medium according to a fifth embodiment of the invention as referring to FIG. 11, which is an explanatory view showing a storage area of an optical disk included in this embodiment. In the fourth embodiment, the data area of each file is secured in a fixed manner. On the other hand, in this embodiment, the data area of each file A or B is made variable so that the updated data may be written on the data areas in any of the files A and B and managed by the management table 20.

The accessing system of this embodiment has the substantially same components as that of the first embodiment. Hence, those components have the same reference number (in particular, the components shown in FIG. 1).

In FIG. 11, 20a denotes an area for a management table 20, which has a proper size and extends from a head block to a proper block of the optical disk. The data area of each file A or B can be secured in a state that the data areas of the files A and B are not fixed. The management table 20 contains a start block location and an initial value "0" of a size (or a last block location) of each file A or B. As shown by 20b, each data of the files A and B is written on the data area and the management table 20 is updated. Then, as shown by 20c, the updated data of the files A and B are written on the data area in an updating sequence as the management table 20 is kept updated.

In the fourth embodiment, the data area of each file F is serially secured in a fixed manner, so that an idle data area may take place. On the other hand, the accessing system according to the fifth embodiment is arranged to write the updated data on the storage areas in any of the files A and B. Hence, the data area of the optical disk can be effectively used. Further, the use of the management table 20 makes it possible to search the non-writing location F2 at high speed. If the power is cut off while the updated data is being written, the management table 20 is not destroyed, so that the updated data may be written on the storage areas again.

Figure 12:
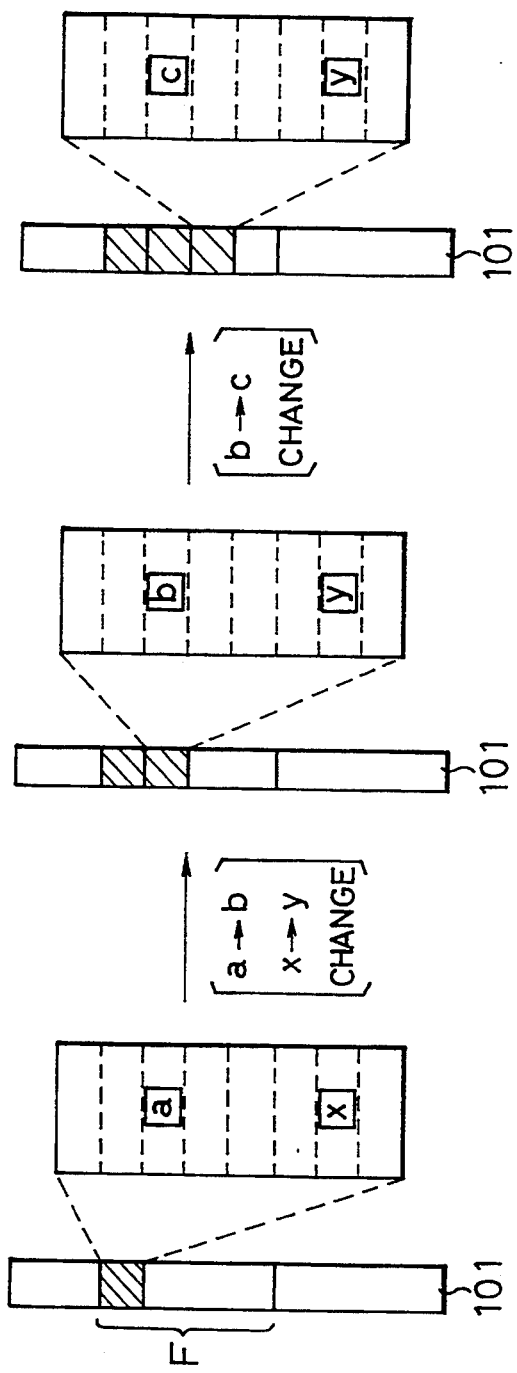
FIG. 12 is an explanatory view showing an updating process executed in the first to the fifth embodiments.
Figure 13:
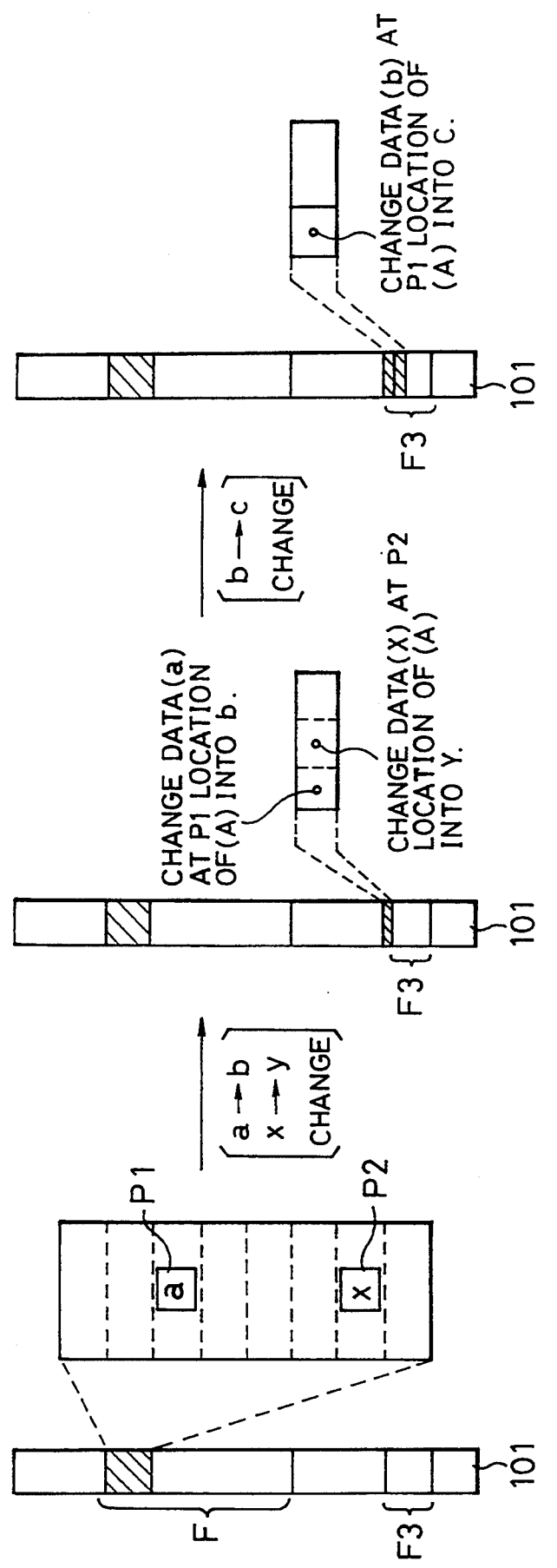
FIG. 13 is an explanatory view showing an updating process executed in a system for accessing a write-once read-many storage medium according to a sixth embodiment of the invention.
Figure 14:
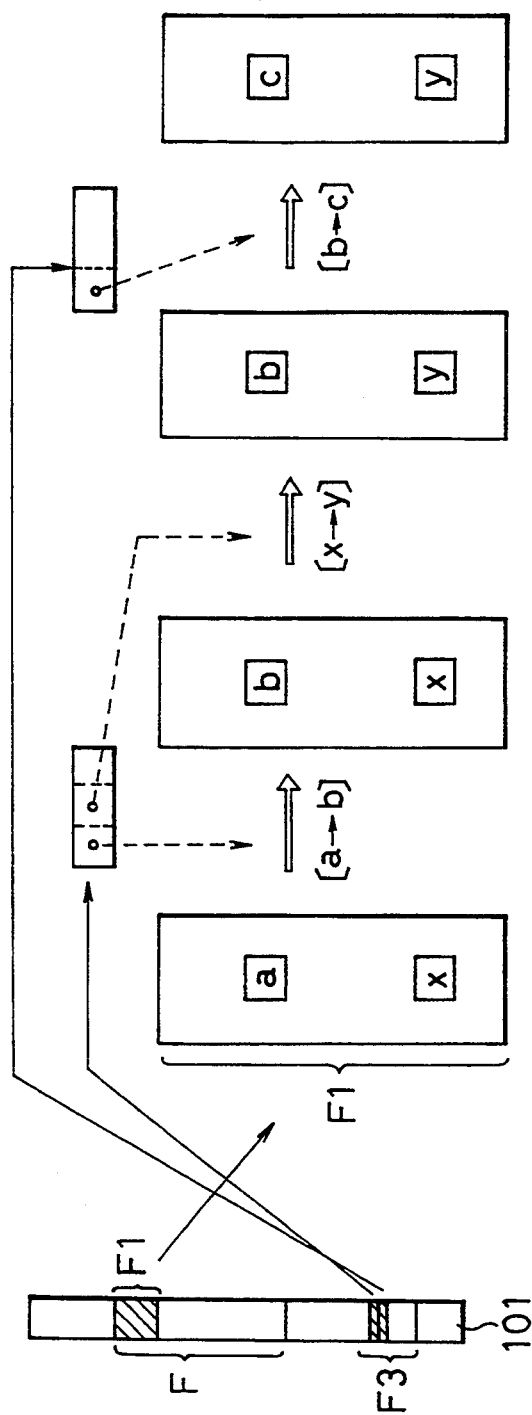
FIG. 14 is an explanatory view showing a process of reading the updated data executed in the sixth embodiment.

In turn, the description will be directed to a system for accessing a write-once read-many storage medium according to a sixth embodiment of the present invention as referring to FIGS. 12 to 14, in which FIG. 12 is an explanatory view showing an updating process executed in the first to the fifth embodiments, FIG. 13 is an explanatory view showing an updating process executed in the sixth embodiment, and FIG. 14 is an explanatory view showing a process for reading the updated data in the sixth embodiment.

In the foregoing first to fifth embodiments, as shown in FIG. 12, all the updated data is written on the file A. On the other hand, as shown in FIG. 13, in the accessing system according to the sixth embodiment, if the data a is modified into data b and data x is modified into data y, only the modified data b and y are written on an update area F3 and management data dedicated to changed information of the modified data b and y is written on the update area F3.

To read the updated data, as shown in FIG. 14, with the management table and the other management table dedicated to changed information, all the data of the file A is read into the memory 15 (or a harddisk if the volume is short) in which the stored data is allowed to be physically modified and updated. With the management data dedicated to the changed information, the read data is expanded into the latest data. According to this embodiment, therefore, only the modified data b and y are written on the storage area without having to write all the updated data of the file A. This results in being able to effectively use the data area of the optical disk.

Figure 15:
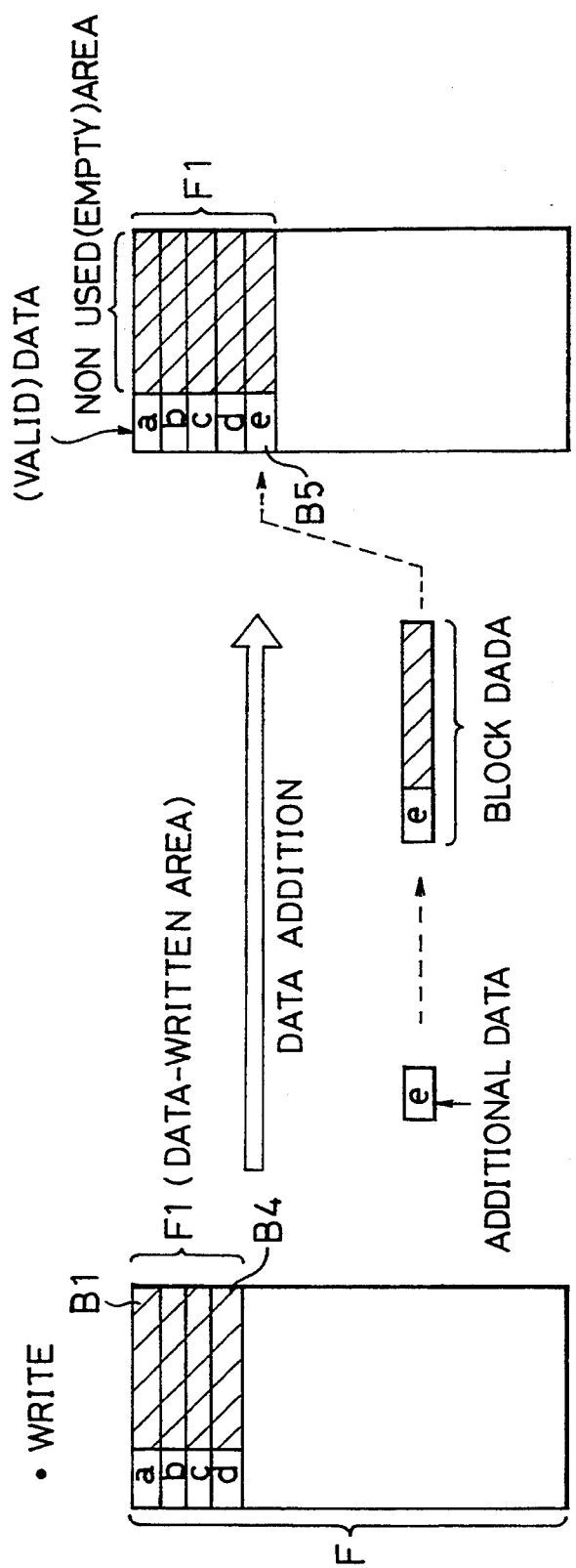
FIG. 15 is an explanatory view showing a general writing process.
Figure 16:
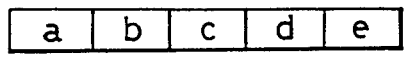
FIG. 16 is an explanatory view showing a process for reading the updated data written on the storage medium by the process shown in FIG. 15.
Figure 18:
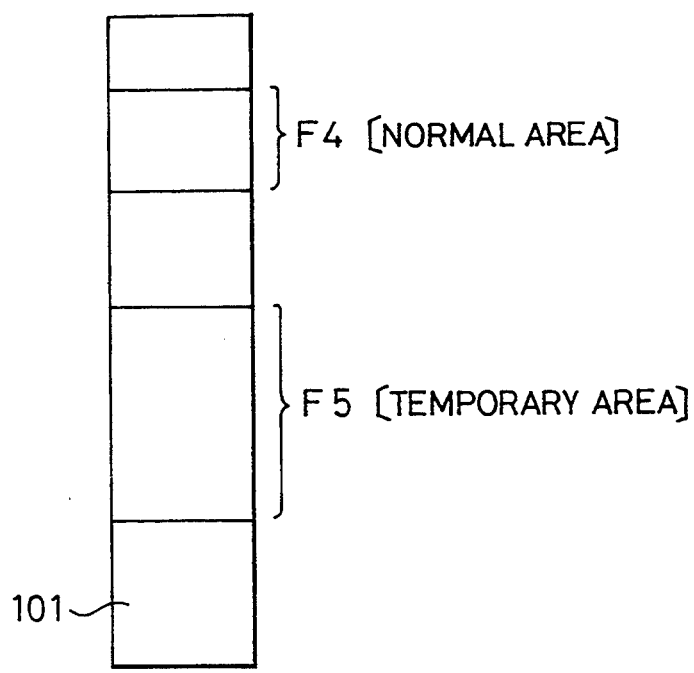
FIG. 18 is an explanatory view showing a storage area of an optical disk served as a write-once read-many storage medium included in a system for accessing the storage medium according to a seventh embodiment of the invention.
Figure 17:
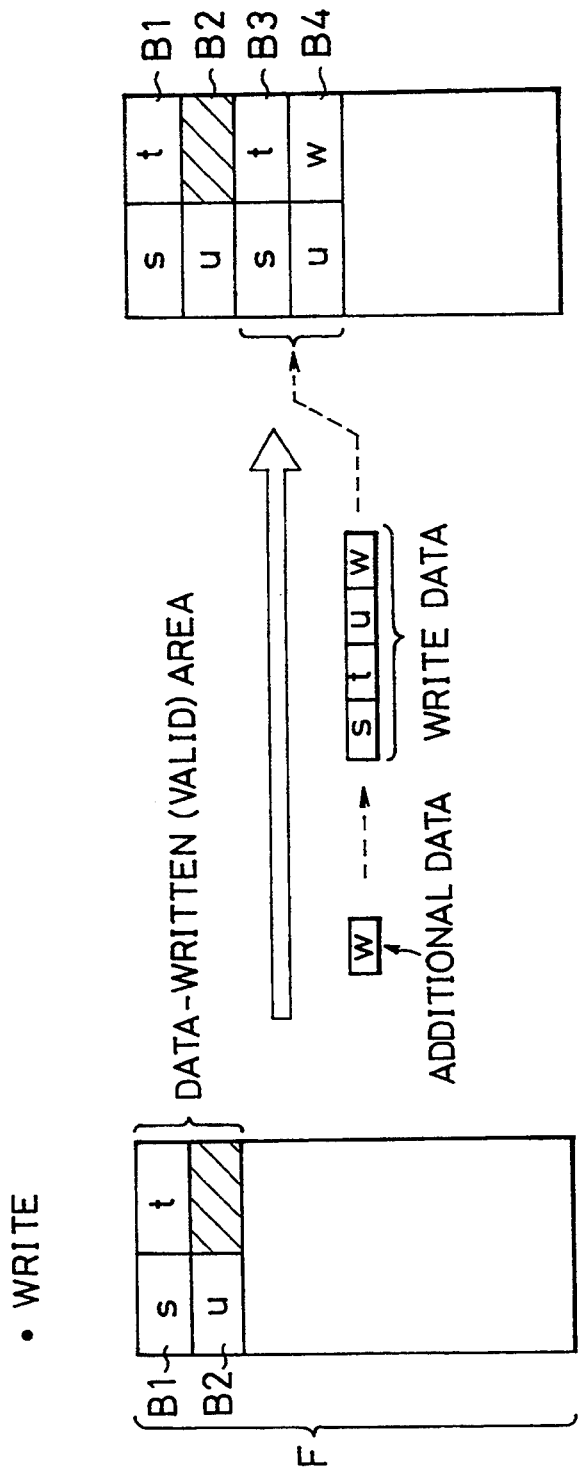
FIG. 17 is an explanatory view showing another general writing process.
Figure 19:
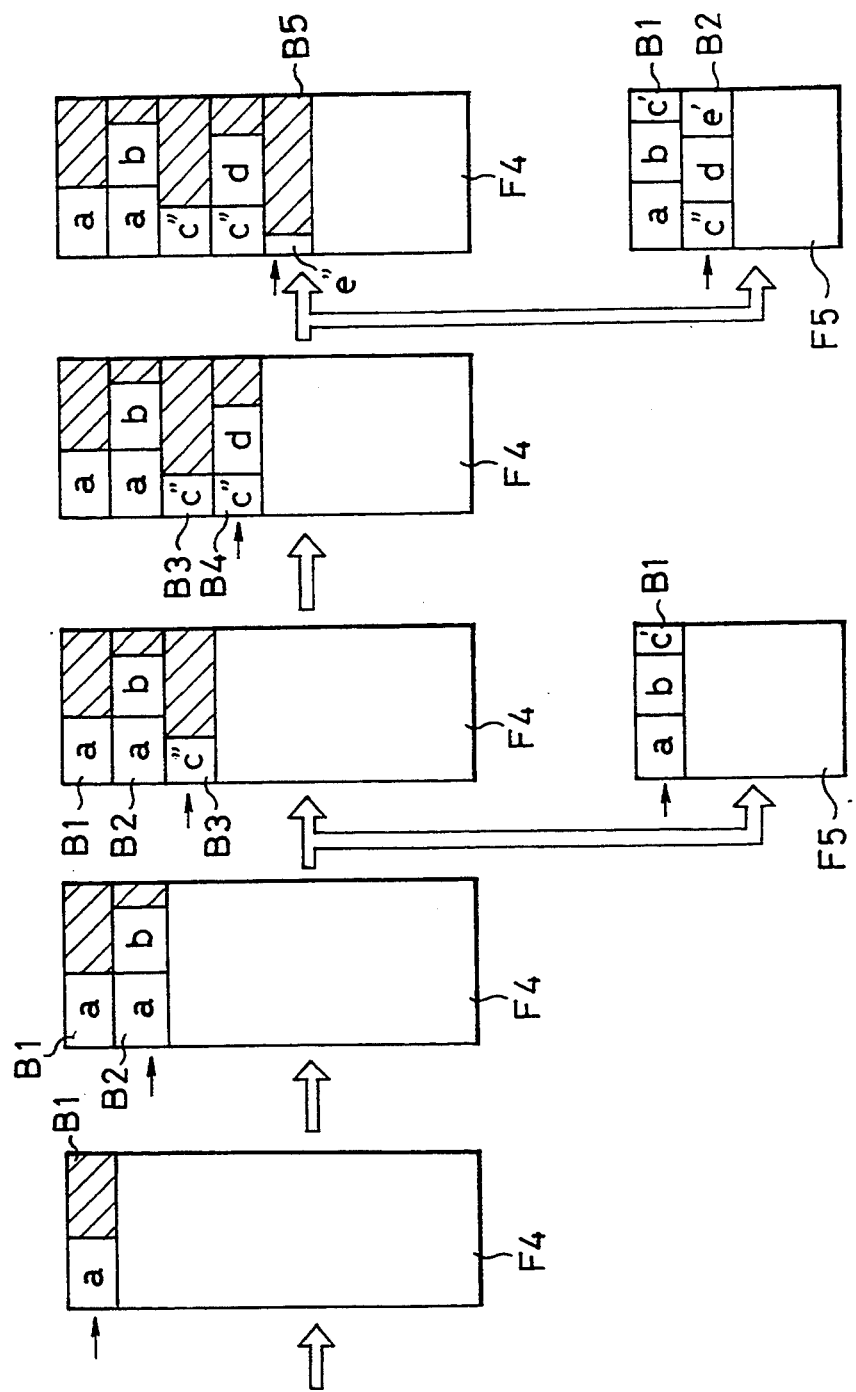
FIG. 19 is an explanatory view showing a writing process executed in the seventh embodiment.

In turn, the description will be directed to a system for accessing a write-once read-many storage medium according to a seventh embodiment of the present invention as referring to FIGS. 15 to 19, in which FIG. 15 is an explanatory view showing a general writing process, FIG. 16 is an explanatory view showing a process for reading the updated data written by the process shown in FIG. 15, FIG. 17 is an explanatory view showing another general writing process, FIG. 18 is an explanatory view showing a storage area of an optical disk in this embodiment, and FIG. 19 is an explanatory view showing a process for writing data in this embodiment.

In the general writing process, as shown in FIG. 15, to write the data a to d on each of the blocks B1 to B4 respectively, an empty area takes place on each of the blocks B1 to B4. To write the additional data e, an empty area takes place on the block B5. To read these pieces of data a to e on the memory 15, as shown in FIG. 16, these pieces of data a to e are read in sequence with no space being left between the adjacent data by considering the empty area of each block B1 to B5 under the control of the management table.

Consider the other general writing process. As shown in FIG. 17, in a case that the data s and t are written into one block B1 and the next data u is written into the next block B2, an empty area takes place in the block B2 of the data u. To write the additional data w, all the pieces of updated data s to w are written into the next blocks B3 and B4. When such pieces of data s to w are read on the memory 15, the updated data s to w written on the blocks B3 and B4 are read into the memory 15.

The writing process shown in FIG. 15 consumes a long time in reading the data, because it considers the empty areas of the blocks B1 to B5 when reading the data. The writing process shown in FIG. 17 causes the idle storage areas to take place, because all the updated data s to w are written on the blocks B3 and B4. On the other hand, as shown in FIG. 18, the accessing system according to the seventh embodiment is arranged to divide the storage area into a temporary area F4 for temporarily storing the data and a normal area F5 for normally storing the data for the purpose of reducing the reading time and effectively using the data area.

Turning to FIG. 19, to write the data a having a smaller amount than one block, the data a is written in the block B1 of the temporary area F4 with an empty area being left in the block B1. To write the data b if the adding amount of the data a and b does not reach the volume of one block, the data a and b are written in the block B2 next to the temporary area F4 with an empty area being left in the block B2. Then, to write the data c if the adding amount of the data a, b and c exceed the volume of one block, that is, to write the data c' and the remaining data c'', the combination of the data c' and the data a and b being equivalent to the volume of one block, the data a, b, and c' are written in the block B1 of the normal area F5 and the remaining data c'' is written in the block B3 next to the temporary area F4 with an empty area being left in the block B3.

To write the data d if the adding amount of the data c'' and the data d does not reach the volume of one block, the data c'' and d may be written in the block B4 next to the temporary area F4 with an empty area being left in the block B4. To write the data e if the combination of the data c'', d and e exceed the volume of one block, the data c'', d and e' are written in the block. B2 of the normal area F5 and the remaining data e'' is written in the block B5 next to the temporary area F4 with an empty area being left in the block B5. To read the written data a to e, the reading process is executed to read the data a to d and e' from the blocks B1 and B2 of the normal area F5 and the data e'' from the block B5 of the temporary area F4.

That is, in a case of writing the data on the temporary area F4, the data is additionally written into the previous block and in the block of the temporary area F4. The remaining data is written in the block next to the temporary area F4. Next, the data in one block of the temporary area F4 is written in the normal area F5. This process makes it possible to effectively use the data area. To read the latest data, the data is read from the normal area F5 having no empty area left therein. This results in reducing the reading time.

Further, like the fifth embodiment, the accessing system according to the seventh embodiment may be arranged to write the updated data in any file and manage the updated data under the control of the management table without having to secure the temporary area F4 and the normal area F5 at each file. This arrangement also results in effectively using the data area. In this case, a pointer pointing to the location of the latest write block of each file may be written in the block of the temporary area for the purpose of making the management easier.

Figure 20:
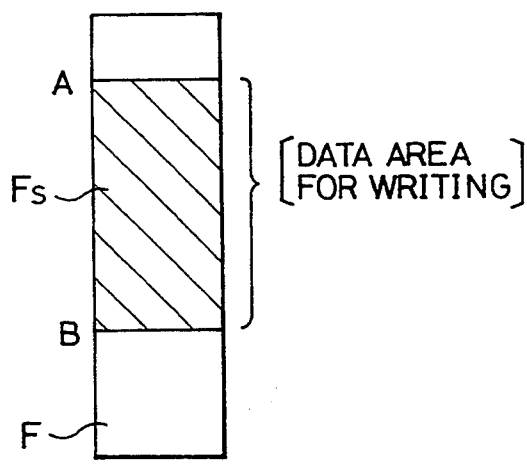
FIG. 20 is an explanatory view showing a location of a block in a storage area of an optical disk served as a write-once read-many storage medium included in a system for accessing the storage medium according to an eighth embodiment of the invention.
Figure 21:
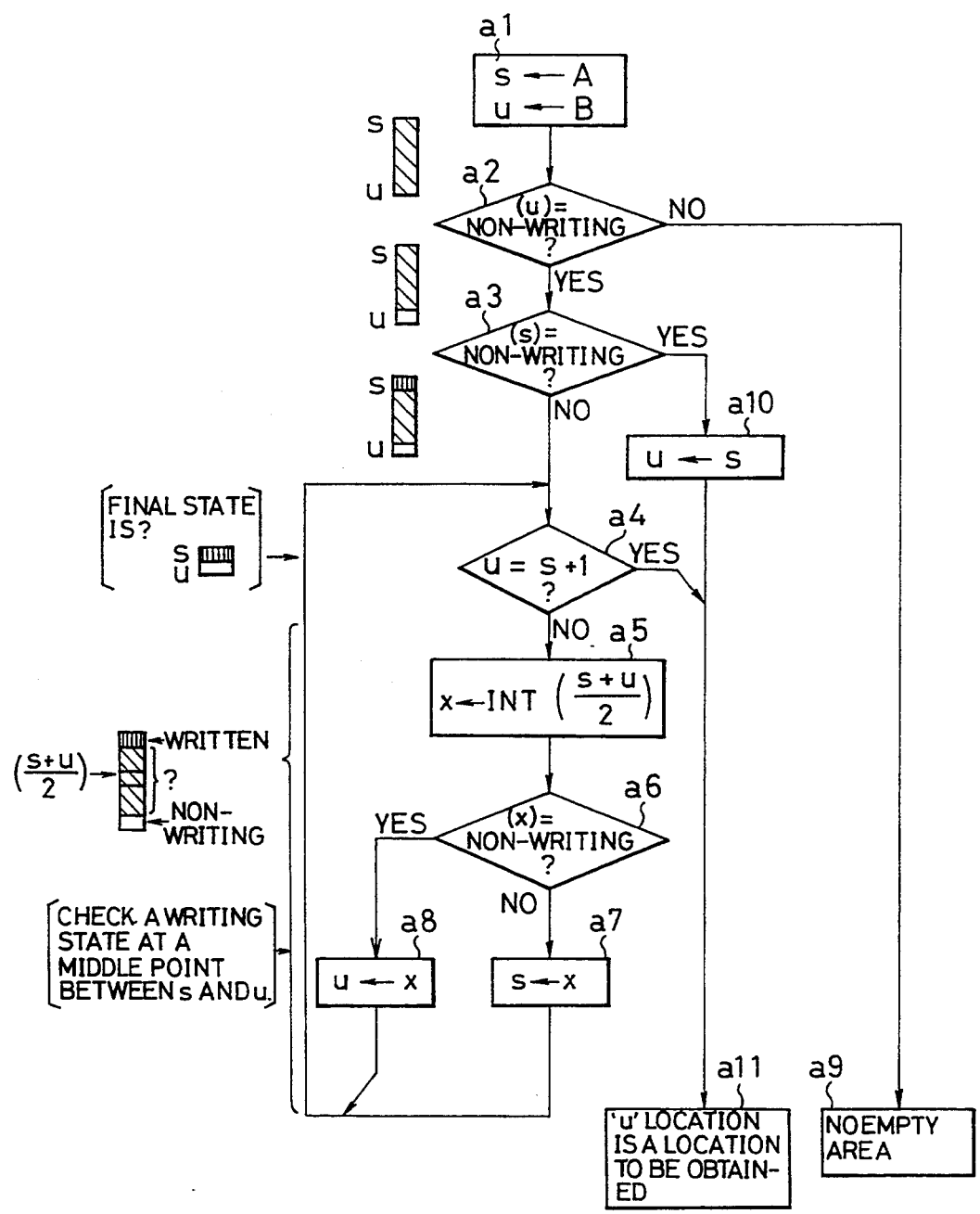
FIG. 21 is a flowchart showing an operation of the system according to the eighth embodiment.

In turn, the description will be directed to a system for accessing a write-once read-many storage medium according to an eighth embodiment of the present invention as referring to FIGS. 20 to 21.

The accessing system of this embodiment has the substantially same components as that of the first embodiment. Hence, those components have the same reference number (in particular, the components shown in FIG. 1).

The updating process and the process for reading the updated data will be described in detail.

As shown in FIG. 20, the file F includes a data area Fs ranging from a block location A to another block location B (B>A).

Assume that variables s, u and x indicate a block locations from which a binary search method is executed and (s), (u) and (x) denote the writing states of the block locations indicated by the variables s, u and x. In the case of update processing, the block location A is set to the variable s and the block location B is set to the variable u (at a step a1 of FIG. 4). Then, at a step a2, it is determined whether or not the writing state (u) for the variable u, that is, the writing state at the last location of the data area Fs is in a non-writing state. If no at the step a2, the process is branched into a step a9 at which the data is written on the overall data area Fs to be searched, that is, no empty area is left.

If yes at the step a2, the process is branched into a step a3. At this step, it is determined whether or not the writing state (s) for the variable s, that is, the writing state at the head location of the data area Fs is in a non-writing state. If yes at the step a3, the process is branched into a step a10 at which the variable s is set to the variable u and thereby the location indicated by the variable u is to be searched (step a11). That is, no data is written on the data area Fs. The head location of the non-writing area is the head location of the data area Fs to be searched. In addition, at the step a11, it is preferable that the size of the data area Fs should be checked.

If no at the step a3, the process is branched into a step a4 at which it is determined whether or not u=s+1 is established. If yes, the process is branched into a step a11 at which the location indicated by the variable u is a location to be searched.

If no at the step a4, the process is branched into a step a5 at which INT {(s+u)/2} is set to the variable x. Then, at a step a6, it is determined whether or not the writing stage (x) for the variable x, that is, the block location at the middle between the locations indicated by the variables s and u is in a non-writing state. If no at the step a6, the process is branched into a step a7 at which the variable x is set to the variable s. It means that the location indicated by the set variable x is a head location of the next area to be searched. Then, the process is branched into the step a4 at which the binary search is continued. If yes at the step a6, the process is branched into a step a 8 at which the variable x is set to the variable u. It means that the location indicated by the set variable x is a last location of the next area to be searched. Then, the process returns into the step a4 at which the binary search is continued.

The process executed at the steps a4 to a8 is continued until u=s+1 is established at the step a4. That is, the binary search continues to check a middle point, a middle point. of the object area. By narrowing the area to be searched, it is possible to finally define two block ranges, that is, the location of a last block in the writing state (the location indicated by the variable s) and the location of a head block in the non-writing state (the location indicated by the variable u).

By obtaining the head location of the non-writing area searched by the above process, the updated data is stored on the data area Fs from the obtained head location. It is preferable that the stored data should be checked for a writing error.

To read the updated data written on the storage area with the above process, like the writing process, the binary search is executed to search a last block in the data-written area and read the latest updated data from the last block. Alternatively, it is possible to take the steps of serially reading the data from the block location A, searching the non-writing area next to the latest updated data, determining whether or not the data on the written area before the non-writing area is valid, and read the latest updated data on the written area on the determined result.

Many widely different embodiments of the present invention may be constructed without departing from the spirit and scope of the present invention. It should be understood that the present invention is not limited to the specific embodiments described in the specification, except as defined in the appended claims.

What is claimed is:

1. A storage medium control system for controlling a write-once read-many storage medium comprising:
   search means for searching a non-writing area next to a last data-written area on a storage area included in said write once read-many storage medium;
   write means for writing tables, each including content and an address of an updated portion of original data in minimum unit, on said non-writing area searched by said search means; and
   means for reading said original data and said tables written by said write means and developing whole updated data with these read data on a memory in which stored data are allowed to be physically modified and updated,
   wherein said search means includes means for searching the non-writing area on said data storage area by using a direct memory access transfer and said write means includes means for allocating any empty area of said storage medium as another data storage area and means for writing the updated data on said another data storage area and a management data containing a location of the allocated area when said data storage area has no space for the updated data.

2. A storage medium control system for controlling a write-once read-many storage medium comprising:
   search means for searching a non-writing area next to a last data-written area on a storage area included in said write-once read-many storage medium;
   write means for writing tables, each including content and an address of an updated portion of original data in minimum unit, on said non-writing area searched by said search means; and
   means for reading said original data and said tables written by said write means and developing whole updated data with these read data on a memory in which stored data are allowed to be physically modified and updated,
   wherein said write means includes means for allocating any empty area of said storage medium as another data storage area and means for writing the updated data on said another data storage area and writing a management data when said data storage area has no space for the updated data and means for changing allocation of said data storage area according to the empty area allocated said allocating means in a case that said updated data is written on said storage area and means for writing a new management data for said changed allocation.

3. A system according to claim 2, wherein said write means includes means for changing allocation of said data storage area according to the empty area allocated said allocating means in a case that said updated data is written on said storage area and means for writing a new management data for said changed allocation.

4. A storage medium control system for controlling a write-once ready-many storage medium comprising:
   search means for searching a non-writing area next to a last data-written area on a storage area included in said write-once read-many storage medium;
   write means for writing tables, each including content and an address of an updated portion of original data in minimum unit, on said non-writing area searched by said search means; and
   means for reading said original data and said tables written by said write means and developing whole updated data with these data on a memory in which stored data are allowed to be physically modified and updated,
   wherein said write means includes means for searching the non-writing area on said data storage area by using a direct memory access transfer and means for allocating any empty area of said storage medium as another data storage area and means for writing the updated data on the another data storage data and writing a management data containing a location of the allocated area when said data storage area has no space for the updated data and means for changing allocation of said data storage area according to the empty area in a case that the updated data is written on said data storage area and means for writing a new management data for said changed allocation.

5. A storage medium control system for controlling a write-once ready-many storage medium comprising:

search means for searching a non-writing area next to a last data-written area on a storage area included in said write-once read-many storage medium;

write means for writing tables, each including content and an address of an updated portion of original data in minimum unit, on said non-writing area searched by said search means; and means for reading said original data and said tables written by said write means and developing whole updated data with these read data on a memory in which stored data are allowed to be physically modified and updated, wherein said search means searches a non-writing area by using a binary search method.

6. A system for accessing a writing-once read-many storage medium comprising:

a first and second data storage area each having a plurality of blocks, said first data storage area being temporarily used for storing unpacked data, said second data storage area being constantly used for storing packed data;

means for combining additional data with a last written data in a block of said first data storage area and writing combined data in the next block in a case that a volume of combined data does not exceed a volume of one block;

means for dividing additional data into a first and second part in a case that said additional data exceeds a volume of remaining area of a last data-written block of said first data storage area, a volume of said first part being selected to be equal to the volume of a remaining area, and for combining data written in the block of said first data storage area with said first part of said additional data and writing the combined data on said second data storage area and writing said second part of said additional data in the next block of said first data storage area; and means for reading all data on said second data storage area and data in a last data-written block of said first data storage area and combining the data of said first storage area with the data of said second data storage area for developing whole updated data.

* * * * *